US010730221B2

(12) United States Patent
Borse et al.

(10) Patent No.: US 10,730,221 B2
(45) Date of Patent: Aug. 4, 2020

(54) MDO MULTILAYER FILM

(71) Applicant: NOVA Chemicals (International) S.A., Fribourg (CH)

(72) Inventors: Nitin Borse, Calgary (CA); Norman Aubee, Okotoks (CA)

(73) Assignee: NOVA Chemicals (International) S.A., Fribourg (CH)

( * ) Notice: Subject to any disclaimer, the term of this patent is extended or adjusted under 35 U.S.C. 154(b) by 206 days.

(21) Appl. No.: 15/531,744

(22) PCT Filed: Dec. 10, 2015

(86) PCT No.: PCT/IB2015/059527
§ 371 (c)(1),
(2) Date: May 31, 2017

(87) PCT Pub. No.: WO2016/097951
PCT Pub. Date: Jun. 23, 2016

(65) Prior Publication Data
US 2017/0274574 A1    Sep. 28, 2017

Related U.S. Application Data

(60) Provisional application No. 62/092,551, filed on Dec. 16, 2014.

(51) Int. Cl.
| | |
|---|---|
| *B29C 48/21* | (2019.01) |
| *B29C 48/08* | (2019.01) |
| *B29C 48/00* | (2019.01) |
| *B32B 27/08* | (2006.01) |
| *B32B 27/18* | (2006.01) |
| *B32B 27/32* | (2006.01) |
| *B32B 7/02* | (2019.01) |
| *B29C 55/00* | (2006.01) |
| *B29C 55/06* | (2006.01) |
| *B29K 23/00* | (2006.01) |
| *B29K 105/00* | (2006.01) |
| *B29L 7/00* | (2006.01) |
| *B29L 9/00* | (2006.01) |
| *B29L 31/00* | (2006.01) |

(52) U.S. Cl.
CPC .......... *B29C 48/21* (2019.02); *B29C 48/0018* (2019.02); *B29C 48/022* (2019.02); *B29C 48/08* (2019.02); *B29C 55/005* (2013.01); *B29C 55/06* (2013.01); *B32B 7/02* (2013.01); *B32B 27/08* (2013.01); *B32B 27/18* (2013.01); *B32B 27/32* (2013.01); *B29K 2023/065* (2013.01); *B29K 2105/0005* (2013.01); *B29K 2995/0063* (2013.01); *B29L 2007/008* (2013.01); *B29L 2009/00* (2013.01); *B29L 2031/712* (2013.01); *B32B 2270/00* (2013.01); *B32B 2307/516* (2013.01); *B32B 2307/72* (2013.01); *B32B 2439/00* (2013.01)

(58) Field of Classification Search
CPC ....... B29C 48/21; B29C 48/022; B29C 48/08; B29C 48/0018; B29C 55/005; B29C 55/06; B29C 48/16; B29C 2049/048; B32B 7/02; B32B 27/08; B32B 27/018; B32B 27/32
See application file for complete search history.

(56) References Cited

U.S. PATENT DOCUMENTS

| | | | |
|---|---|---|---|
| 5,342,868 A | 8/1994 | Kimura et al. | |
| 5,981,636 A | 11/1999 | Amos et al. | |
| 6,033,509 A * | 3/2000 | Miyamoto | ................ B32B 3/10 156/164 |
| 6,465,551 B1 | 10/2002 | Zhao et al. | |
| 6,599,971 B2 | 7/2003 | Dotson et al. | |
| 7,737,220 B2 | 6/2010 | Swabey et al. | |
| 9,802,394 B2 † | 10/2017 | Cavacas | |
| 2006/0047078 A1 * | 3/2006 | Swabey | .................. C08L 23/06 525/240 |
| 2008/0118749 A1 * | 5/2008 | Aubee | ..................... B32B 27/32 428/340 |
| 2016/0229158 A1 * | 8/2016 | Cavacas | .................. B32B 27/08 |

OTHER PUBLICATIONS

ASTM F 1249-90 (Reapproved 1995); Standard Test Method for Water Vapor Transmission Rate Through Plastic Film and Sheeting Using a Modulated Infrared Sensor; Copyright ASTM International. Current edition approved Jul. 27, 1990. Published Sep. 1990. Originally published as F 1249-89. Last previous edition F 1249-89. pp. 1-5.
ASTM D 6474-99 (Reapproved 2006); Standard Test Method for Determining Molecular Weight Distribution and Molecular Weight Averages of Polyolefins by High Temperature Gel Permeation Chromatography; copyright ASTM International. Current edition approved Mar. 15, 2006. Published Apr. 2006. Originally approved in 1999. Last previous edition approved in 1999 as D6474-99. pp. 1-6.
ASTM D 2457-03; Standard Test Method for Specular Gloss of Plastic Films and Solid Plastics; Copyright ASTM International. Current edition approved Aug. 10, 2003. Published Oct. 2003. Originally approved in 1965. Last previous edition approved in 1997 as D 2457-97. pp. 1-5.

(Continued)

*Primary Examiner* — Stella K Yi
(74) *Attorney, Agent, or Firm* — Thomas J. Styslinger

(57) ABSTRACT

A multilayer film having Machine Direction Orientation (MDO) is prepared by first co-extruding a multilayer film, then stretching the multilayer film in the machine direction at a temperature lower than the melting point of the polyethylene resin that is used to prepare the film. At least one layer of the film is a first polyethylene composition having a density of from about 0.94 to about 0.97 g/cc and at least one second layer is prepared from a polyethylene composition having a lower density than the first polyethylene composition. This disclosure enables the manufacture of films having outstanding barrier properties (low Water Vapor Transmission Rate, WVTR, and low Oxygen Transmission Rate, OTR) and good physical properties.

17 Claims, No Drawings

(56) References Cited

OTHER PUBLICATIONS

ASTM D 1238-04; Standard Test Method for Melt Flow Rates of Thermoplastics by Extrusion Plastometer; Copyright ASTM International. Current edition approved Mar. 1, 2004. Published Apr. 2004. Originally approved in 1965. Last previous edition approved in 2001 as D 1238-01. pp. 1-13.

ASTM D 1003-07; Standard Test Method for Haze and Luminous Transmittance of Transparent Plastics; Copyright ASTM International; Current edition approved Nov. 1, 2007. Published Nov. 2007. Originally approved in 1949. Last previous edition approved in 2000 as D 1003-00. pp. 1-7.

ASTM D 882-10; Standard Test Method for Tensile Properties of thin Plastic Sheeting; Copyright ASTM International; Current edition approved Apr. 1, 2010. Published Jun. 2010. Originally approved in 1946. Last previous edition approved in 2009 as D882-09. pp. 1-10.

Chatterjee, et al., "Machine Direction Orientation of High Density Polyethylene (HDPE): Barrier and Optical Properties," 55 Polymer 4102-15 (2014).†

\* cited by examiner
† cited by third party

MDO MULTILAYER FILM

TECHNICAL FIELD

This disclosure relates to Machine Direction Oriented (MDO) films prepared from a co-extruded multilayer polyethylene precursor film which includes a layer made from a High Density Polyethylene ("HDPE") composition.

BACKGROUND ART

Polyethylene film is used in a wide variety of applications such as the preparation of food packages, heavy duty sacks, collation shrink packaging and trash can liners. Polyethylene is commonly described in terms of melt index (which provides an indication of the molecular weight of the polyethylene) and density.

The MDO films described in this disclosure are prepared with a precursor film (i.e., a non-stretched film) that contains at least one layer of HDPE and at least one layer that is made from a polyethylene having a lower density.

HDPE is now commonly used in the preparation of "barrier film" which is resistant to the transmission of water. Barrier film is especially suitable for packaging dry foods such as breakfast cereals and crackers. Monolayer HDPE barrier film has limited use because several of the properties of such film—including impact strength, tear strength and sealing temperature—are inferior to those of lower density polyethylene. The use of a multilayer film that contains a layer of HDPE and a layer of a lower density resin can mitigate some of these problems but this is generally done at a cost of reducing the barrier properties of the multilayer film in comparison to a monolayer HDPE film.

This disclosure provides a multilayer film that is subjected to machine direction orientation (MDO) in a process whereby the film is stretched after the film is initially formed in a conventional extrusion process. One layer of the film is made from a high density polyethylene composition which, in one embodiment, contains a nucleating agent. The multilayer MDO films of this disclosure exhibit a balance of barrier and physical properties that makes them suitable for many packaging applications.

DISCLOSURE OF INVENTION

In one embodiment, this disclosure provides a method for producing an oriented multilayer film comprising:
co-extruding a multilayer film comprising
a first layer prepared from a high density polyethylene composition having a melt index, $I_2$, of from about 0.2 to about 10 grams per 10 minutes, a density of from about 0.95 to about 0.97 g/cc and from about 100 to about 9000 parts per million of a nucleating agent; and
a second layer prepared from a second polyethylene composition having a melt index, $I_2$, of from about 0.2 to about 10 grams per 10 minutes and a density which is lower than the density of said first polyethylene composition by an amount of from about 0.010 to about 0.060 g/cc; and
stretching said multilayer film in the machine direction at a stretch ratio of from about 1:2 to about 1:12.

In another embodiment, this disclosure provides a method for producing an oriented multilayer film comprising:
co-extruding a multilayer film comprising
a first layer prepared from a high density polyethylene composition having a melt index, $I_2$, of from about 0.2 to about 10 grams per 10 minutes; a density of from about 0.95 to about 0.97 g/cc and a Mw/Mn of from about 5 to about 12, with a first proviso that said first polyethylene composition is a blend of at least two blend components comprising a first blend component having a Mw/Mn of from about 2 to about 4 and a second blend component having a Mw/Mn of from about 2 to about 4; with a second proviso that the melt index, $I_2$, of the second blend component is at least ten times greater than the melt index of the first blend component; and
a second layer prepared from a second polyethylene composition having a melt index, $I_2$, of from about 0.2 to about 10 grams per 10 minutes and a density which is lower than the density of said first polyethylene composition by an amount of from about 0.010 to about 0.060 g/cc; and
stretching said multilayer film in the machine direction at a stretch ratio of from about 2/1 to about 12/1.

As noted above, high density polyethylene provides excellent barrier properties but inferior strength and tear properties in comparison to lower density polyethylenes. A multilayer film which contains a layer of HDPE and a layer of lower density polyethylene can provide a film having better physical properties (but at the expense of lower barrier properties for a given thickness of film). The present disclosure enables the manufacture of a multilayer film that includes a layer of HDPE and a layer of a lower density polyethylene but still provides excellent barrier performance.

BEST MODE FOR CARRYING OUT THE INVENTION

Polyethylene

The MDO films of this disclosure are prepared from a multilayer film in which at least one of the layers is prepared from an HDPE composition (described in Part A.1, below) and at least one of the layers is prepared from a polyethylene composition having a lower density than the HDPE composition (described in Part A.2, below).

A.1 HDPE Composition

HDPE is a common item of commerce. Most commercially available HDPE is prepared from a catalyst that contains at least one metal; non-limiting examples include chromium, titanium, zirconium and hafnium. HDPE that is made from a Cr catalyst typically contains some long chain branching (LCB).

HDPE that is made from a group IV metal (titanium, zirconium and hafnium) generally contains less LCB than HDPE made from a Cr catalyst. While not wishing to be bound by theory, it has been postulated that the presence of LCB can reduce the effectiveness of a nucleating agent. The use of HDPE prepared with a group IV metal (especially Ti or Zr) is generally preferred for use in this disclosure.

As used herein, the term "HDPE" refers to a polyethylene (or polyethylene blend composition, as required by context) having a density of from about 0.95 to about 0.97 grams per cubic centimeter (g/cc). In an embodiment, the melt index ("$I_2$") of the HDPE is from about 0.2 to about 10 grams per 10 minutes.

In an embodiment, the HDPE is provided as a blend of two HDPEs having melt indices that are separated by at least a decade. Further details of this HDPE blend composition follow.

HDPE Blend Composition

Blend Components

Blend Component a)

Blend component a) of the polyethylene composition used in this embodiment comprises an HDPE with a comparatively high melt index. As used herein, the term "melt index" is meant to refer to the value obtained by ASTM D 1238 (when conducted at 190° C., using a 2.16 kg weight). This term is also referenced to herein as "$I_2$" (expressed in grams of polyethylene which flow during the 10 minute testing period, or "gram/10 minutes"). As will be recognized by those skilled in the art, melt index, $I_2$, is inversely proportional to molecular weight. In one embodiment, blend component a) has a comparatively high melt index (or, alternatively stated, a comparatively low molecular weight) in comparison to blend component b).

The absolute value of $I_2$ for blend component a) in these blends is generally greater than 5 grams/10 minutes. However, the "relative value" of $I_2$ for blend component a) is more important and it should generally be at least 10 times higher than the $I_2$ value for blend component b) [which $I_2$ value for blend component b) is referred to herein as $I_2'$]. Thus, for the purpose of illustration: if the $I_2'$ value of blend component b) is 1 gram/10 minutes, then the $I_2$ value of blend component a) is preferably at least 10 grams/10 minutes.

In one embodiment, blend component a) may be further characterized by:

having a density of from about 0.95 to about 0.97 g/cc; and being present in an amount of from about 5 to about 60 weight % of the total HDPE blend composition (with blend component b) forming the balance of the total composition) with amounts of from about 10 to about 40 weight %, especially from about 20 to about 40 weight %, being generally preferred. It is permissible to use more than one high density polyethylene to form blend component a).

The molecular weight distribution [which is determined by dividing the weight average molecular weight (Mw) by number average molecular weight (Mn) where Mw and Mn are determined by gel permeation chromatography, according to ASTM D 6474-99] of component a) is preferably from about 2 to about 20, especially from about 2 to about 4. While not wishing to be bound by theory, it is believed that a low Mw/Mn value (from 2 to 4) for component a) may improve the crystallization rate and overall barrier performance of blown films prepared according to the disclosed process.

Blend Component b)

Blend component b) is also a high density polyethylene which has a density of from about 0.95 to about 0.97 g/cc (preferably from about 0.955 to about 0.968 g/cc).

The melt index of blend component b) is also determined by ASTM D 1238 at 190° C. using a 2.16 kg load. The melt index value for blend component b) (referred to herein as $I_2'$) is lower than that of blend component a), indicating that blend component b) has a comparatively higher molecular weight. The absolute value of $I_2'$ is preferably from about 0.1 to about 2 grams/10 minutes.

The molecular weight distribution (Mw/Mn) of component b) is not critical to the success of the embodiments described in this disclosure, though a Mw/Mn of from about 2 to about 4 is preferred for component b).

Finally, the ratio of the melt index of component b) divided by the melt index of component a) is preferably greater than 10/1.

Blend component b) may also contain more than one HDPE resin.

Overall HDPE Blend Composition

The overall high density blend composition is formed by blending together blend component a) with blend component b). In an embodiment, this overall HDPE composition has a melt index (ASTM D 1238, measured at 190° C. with a 2.16 kg load) of from about 0.5 to about 10 grams/10 minutes (preferably from about 0.8 to about 8 grams/10 minutes).

The blends may be made by any blending process, such as: 1) physical blending of particulate resin; 2) co-feed of different HDPE resins to a common extruder; 3) melt mixing (in any conventional polymer mixing apparatus); 4) solution blending; or, 5) a polymerization process which employs 2 or more reactors.

A suitable HDPE blend composition may be prepared by melt blending the following two blend components in an extruder:

from about 10 to about 30 weight % of component a): where component a) is an HDPE resin having a melt index, $I_2$, of from about 15 to about 30 grams/10 minutes and a density of from about 0.95 to about 0.97 g/cc with from about 90 to about 70 weight % of component b): where component b) is an HDPE resin having a melt index, $I_2$, of from about 0.8 to about 2 grams/10 minutes and a density of from about 0.95 to about 0.97 g/cc.

An example of a commercially available HDPE resin which is suitable for component a) is sold under the trademark SCLAIR™ 79F, which is an HDPE resin that is prepared by the homopolymerization of ethylene with a conventional Ziegler Natta catalyst. It has a typical melt index of 18 grams/10 minutes and a typical density of 0.963 g/cc and a typical molecular weight distribution of about 2.7.

Examples of commercially available HDPE resins which are suitable for blend component b) include (with typical melt index and density values shown in brackets):

SCLAIR™ 19G (melt index=1.2 grams/10 minutes, density=0.962 g/cc);

MARFLEX™ 9659 (available from Chevron Phillips, melt index=1 grams/10 minutes, density=0.962 g/cc); and ALATHON™ L 5885 (available from Equistar, melt index=0.9 grams/10 minutes, density=0.958 g/cc).

A preferred HDPE blend composition is prepared by a solution polymerization process using two reactors that operate under different polymerization conditions. This provides a uniform, in situ blend of the HDPE blend components. An example of this process is described in U.S. Pat. No. 7,737,220 (Swabey et al.). As shown in the examples, this HDPE composition provides good barrier performance.

A.2 Lower Density Polyethylene

The precursor multilayer film used in this disclosure contains at least one layer that is prepared from a polyethylene composition having a lower density than the HDPE composition described above.

In an embodiment, this lower density composition is a medium density polyethylene composition having a density of from about 0.925 to about 0.945 g/cc.

In another embodiment, this lower density composition is a linear low density polyethylene composition having a density of from about 0.900 to about 0.925 g/cc.

In another embodiment, the melt index, $I_2$, of the lower density composition is from about 0.2 to about 10 g/10 minutes especially from about 0.5 to about 5 g/10 minutes.

In another embodiment, the lower density composition is prepared with a single site catalyst (as shown in examples).

It will be recognized by those skilled in the art that lower density polyethylene generally has better strength properties (i.e., better impact strength, puncture resistance and tear strength) than higher density polyethylene. In contrast, higher density polyethylene typically produces films having better barrier properties than films prepared from lower density polyethylene, e.g., LLDPE. The superior WVTR of monolayer HDPE films (in comparison to LLDPE films) is shown in the examples.

The examples also illustrate that multilayer films have a MVTR that is proportional to the MVTR of the individual layers (in the unstretched state). However, the examples also show that the present disclosure enables the manufacture of a multilayer MDO film that has superior MVTR than an unstretched HDPE film of the same thickness.

B. Nucleating Agents

The term nucleating agent, as used herein, is meant to convey its conventional meaning to those skilled in the art of preparing nucleated polyolefin compositions, namely an additive that changes the crystallization behavior of a polymer as the polymer melt is cooled. In an embodiment, the nucleating agents are "organic" (i.e., components which contain carbon and hydrogen atoms) as opposed to inorganic nucleating agents such as talc or zinc oxide (which in general, are much less effective nucleating agents than the "organic" nucleating agents described above).

A review of nucleating agents is provided in U.S. Pat. Nos. 5,981,636; 6,465,551 and 6,599,971.

Examples of conventional nucleating agents which are commercially available and in widespread use as polypropylene additives are the dibenzylidene sorbital esters (such as the products sold under the trademark Millad™ 3988 by Milliken Chemical and Irgaclear™ by Ciba Specialty Chemicals).

The nucleating agents should be well dispersed in the HDPE. The amount of nucleating agent used is comparatively small, e.g., from 100 to 9000 parts by million per weight (based on the weight of the HDPE) so it will be appreciated by those skilled in the art that some care must be taken to ensure that the nucleating agent is well dispersed. It is preferred to add the nucleating agent in finely divided form (i.e., having an average particle size of less than 50 microns, especially less than 10 microns) to the polyethylene to facilitate mixing. The use of a "masterbatch" of the nucleator (where the term "masterbatch" refers to the practice of first melt mixing the nucleating agent with a small amount of polyethylene—then melt mixing the "masterbatch" with the remaining bulk of the HDPE resin) can also help to disperse the nucleating agent.

Examples of nucleating agents which may be suitable for use in the present disclosure include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophtalic acid structure (or "HHPA" structure) as disclosed in U.S. Pat. No. 6,559,971 (Dotson et al., to Milliken); phosphate esters, such as those disclosed in U.S. Pat. No. 5,342,868 and those sold under the trade names NA-11 and NA-21 by Asahi Denka Kogyo and metal salts of glycerol (especially zinc glycerolate). The accompanying examples illustrate that the calcium salt of I,2-cyclohexanedicarboxylic acid, calcium salt (CAS registry number 491589-22-1) provides exceptionally good results. The use of more than one nucleating agent may also be suitable. For example, talc and zinc oxide are commonly used as additives in polyethylene resin (because they provide "anti-blocking" and "acid scavenging" performance, respectively) but they are also known to provide some nucleation performance. A composition which contains at least one of the organic nucleating agents described above plus talc (and/or zinc oxide) is suitable for use in this disclosure.

C. MDO Description

Machine Direction Orientation (MDO) is well known to those skilled in the art and the process is widely described in the literature. MDO takes place after a film has been formed. The "precursor" film (i.e., the film as it exists prior to the MDO process) may be formed in any conventional film molding process. Two film forming processes that are in wide commercial use (and are suitable for preparing the precursor film) are the blown film process and the cast film process.

The precursor film is stretched (or, alternatively stated, strained) in the MDO process. The stretching is predominantly in one direction, which is the "machine direction" from the initial film molding process (i.e., as opposed to the transverse direction. The thickness of the film decreases with stretching. A precursor film that has an initial thickness of 10 mils and a final thickness after stretching of 1 mil is described as having a "stretch ratio" or "draw down" ratio of 1:10.

In general, the precursor film may be heated during the MDO process. The temperature is typically higher than the glass transition temperature of the polyethylene and lower than the melting temperature and more specifically, is typically from about 70 to about 120° C. for a polyethylene film. Heating rollers are generally used to provide this heat.

A typical MDO process utilizes a series of rollers that operate at different speeds to apply a stretching force on a film. In addition, two or more rollers may cooperate together to apply a comparison force (or "nip") on the film.

The stretched film is generally overheated (i.e., maintained at an elevated temperature—typically, from about 90 to about 125° C.) to allow the stretched film to relax.

The disclosure is illustrated in further detail by the following non limiting example.

EXAMPLE

The following test methods were used.

Melt Index: "$I_2$", was determined according to ASTM D1238. [Note: $I_2$ measurements are made with a 2.16 kg weight at 190° C.] Test results are reported in units of grams/10 minutes.

Number average molecular weight (Mn), weight average molecular weight (Mw) and MWD (calculated by Mw/Mn) were determined by high temperature Gel Permeation Chromatography "GPC" with differential refractive index "DRI" detection using universal calibration.

Secant Modulus (MD/TD) was determined according to ASTM D882.

Density was determined using the displacement method according to ASTM D792.

Gloss was determined by ASTM D2457.

Haze was determined by ASTM D1003.

Water Vapor Transmission Rate ("WVTR", expressed as grams of water vapor transmitted per 100 square inches of film per day at a specified film thickness (mils), or g/100 in$^2$/day) was measured in accordance with ASTM F1249-90 with a MOCON permatron developed by Modern Controls Inc. at conditions of 100° F. (37.8° C.) and 100% relative humidity.

The following polyethylene compositions were used in this example.

sHDPE-1 is an ethylene homopolymer composition that is prepared in a dual reactor solution polymerization process using a single site catalyst, using procedures in substantial accordance with those described in U.S. Pat. No. 7,737,220. A high molecular weight homopolymer (having an Mw/Mn of about 2) is prepared in the first reactor and a low molecular weight homopolymer is prepared in the second reactor. The I$_2$ of the low molecular weight homopolymer from reactor 2 is more than ten times higher than the I$_2$ of the high molecular weight homopolymer from reactor 1. The density of the overall blend composition is about 0.967 g/cc, the melt index (I$_2$) is about 1.2 g/10 minutes and the Mw/Mn is about 8.

sHDPE-1 also contains about 1200 ppm of a nucleating agent (sold under the trade name HYPERFORM® HPN20E by Milliken Chemicals).

HDPE-2 is an ethylene homopolymer made with a Ziegler Natta catalyst (containing Ti). It has a density of about 0.96 g/cc and a melt index of about 1.2 [19G].

HDPE-3 is an ethylene homopolymer made with a Ziegler Natta catalyst (containing Ti). It has a density of about 0.96 g/cc and a melt index of about 1 (19C).

sLLDPE-1 is an ethylene-octene copolymer made with a single site catalyst (containing Ti). It has a density of about 0.916 g/cc, a melt index of about 0.7 g/cc, a CDBI of greater than 70%, an Mw/Mn of about 2.8 and was prepared in a dual reactor solution polymerization process.

For convenience, some of the above described properties are provided in Table 1.

TABLE 1

| Polyethylene Composition | | |
|---|---|---|
| Type | Melt Index, dg/min | Density, g/cc |
| sHDPE-1 | 1.2 | 0.967 |
| HDPE-2 | 1.2 | 0.96 |
| HDPE-3 | 1 | 0.96 |
| sLLDPE | 0.7 | 0.916 |

Three layer films were then prepared on a blown film line. For convenience, the three layers may be referred to as A/B/C—with layers A and C being the external layers (often referred to as "skin" layers) and layer B being the core layer. Table 2 shows the composition and thickness of the films.

These thick films were then subjected to a Machine Direction Orientation (MDO) process. The MDO was done at temperatures between about 98 to about 121° C. at the stretch ratios shown in Table 3. By way of example, (and for clarity), the precursor film 1 from Table 2 was used to prepare 3 MDO films (stretch ratios 1:6; 1:8; and 1:9) as shown in Table 3.

Table 3 shows that various thinner films were prepared by stretching the thick film by increasing amounts.

The thickness and the Water Vapor Transmission rate of these films are reported in Table 3. As shown in Table 3, comparative monolayer films prepared from only the nucleated HDPE composition (sHDPE-1) have excellent barrier properties (as indicated by low WVTR values) and comparative films prepared from only the sLLDPE composition have comparatively poor barrier properties.

Precursor films comprising two skin layers of sLLDPE and a core layer of sHDPE had intermediate barrier properties. However, when these precursor films were subjected to the MDO process at stretch ratios of at least 1:6, a very surprising and unexpected observation was made—the absolute WVTR values of these films is better than the WVTR value of the film prepared from sHDPE-1 alone.

TABLE 2

| Film | Layer A (wt %) | Layer B (wt %) | Layer C (wt %) |
|---|---|---|---|
| 1 | sHDPE-1 (25) | sHDPE-1 (50) | sHDPE-1 (25) |
| 2 | HDPE-2 (25) | HDPE-2 (50) | HDPE-2 (25) |
| 3 | sLLDPE-1 (25) | sHDPE-1 (50) | sLLDPE-1 (25) |
| 4 | sLLDPE-1 (15) | sHDPE-1 (70) | sLLDPE-1 (15) |
| 5 | sLLDPE-1 (25) | HDPE-3 (50) | sLLDPE-1 (25) |

TABLE 3

| Film | Stretch Ratio | Film Gauge mil | WVTR G/100 In$^2$ · mil/D | % change against non-MDO film (1:1) |
|---|---|---|---|---|
| 1 | Stretch Ratio 1:1 | 7.2 | 0.1728 | 0.0 |
| 1.6 | Stretch Ratio 1:6 | 1.7 | 0.2329 | 34.8 |
| 1.8 | Stretch Ratio 1:8 | 1.1 | 0.20493 | 18.6 |
| 1.9 | Stretch Ratio 1:9 | 0.9 | 0.15822 | -8.4 |
| 2 | Stretch Ratio 1:1 | 6.7 | 0.37989 | 0.0 |
| 2.6 | Stretch Ratio 1:6 | 1.4 | 0.36274 | -4.5 |
| 2.8 | Stretch Ratio 1:8 | 0.9 | 0.25929 | -31.7 |
| 3 | Stretch Ratio 1:1 | 6.3 | 0.28287 | 0.0 |
| 3.4 | Stretch Ratio 1:4 | 1.8 | 0.30618 | 8.2 |
| 3.6 | Stretch Ratio 1:6 | 1.4 | 0.2559 | -9.5 |
| 3.7 | Stretch Ratio 1:7 | 1.1 | 0.1804 | -36.2 |
| 3.8 | Stretch Ratio 1:8 | 0.8 | 0.12136 | -57.1 |
| 4 | Stretch Ratio 1:1 | 7 | 0.2184 | 0.0 |
| 4.4 | Stretch Ratio 1:4 | 1.7 | 0.19261 | -11.8 |
| 4.6 | Stretch Ratio 1:6 | 1.4 | 0.20104 | -7.9 |
| 4.7 | Stretch Ratio 1:7 | 1.1 | 0.1298 | -40.6 |
| 4.8 | Stretch Ratio 1:8 | 1 | 0.1231 | -43.6 |
| 5 | Stretch Ratio 1:1 | 7.3 | 0.53874 | 0.0 |
| 5.5 | Stretch Ratio 1:5 | 1.6 | 0.29392 | -45.4 |

Note:
The stretch ratio numbers reflect an aim point; the film thickness values were measured.

INDUSTRIAL APPLICABILITY

The films of this invention are suitable for use in a wide variety of packaging applications.

The invention claimed is:
1. A method for producing an oriented multi-layer film comprising:
A) co-extruding a multilayer film comprising:
1) a first layer prepared from a first high density polyethylene composition having a melt index, I$_2$, of from about 0.2 to about 10 grams per 10 minutes, a density of from about 0.94 to about 0.97 g/cc and from about 100 to about 9000 parts per million of a nucleating agent, wherein the first layer is a core layer; and 2) a second layer prepared from a second polyethylene composition having a melt index, $I_2$, of from about 0.2 to about 10 grams per 10 minutes and a density which is lower than the density of said first high density polyethylene composition by an amount of from about 0.010 to about 0.060 g/cc; and B) stretching said multilayer film in the machine direction at a stretch ratio of from about 1:2 to about 1:12; wherein melt index is measured according to ASTM D1238 at 190° C. using a 2.16 kg weight and density is measured according to ASTM D792.

2. The method of claim 1, wherein said stretching is done at a temperature below about 120° C.

3. The method of claim 1, wherein said multilayer film is a three layer film having at least one skin layer prepared from said second polyethylene composition and a core layer prepared from said first high density polyethylene composition.

4. The method of claim 1, wherein said multilayer film comprises at least five layers and wherein said multilayer film has two skin layers prepared from said second polyethylene composition and at least one core layer prepared from said first high density polyethylene composition.

5. The method of claim 1, wherein said multilayer film has a thickness of from about 0.5 to about 3 mils after said stretching.

6. A film made by the method of claim 1.

7. A package prepared from a film according to claim 6.

8. A method for producing an oriented multilayer film comprising:

A) co-extruding a multilayer film comprising:

1) a first layer prepared from a first high density polyethylene composition having a melt index, $I_2$, of from about 0.2 to about 10 grams per 10 minutes; a density of from about 0.95 to about 0.97 g/cc and a Mw/Mn of from about 5 to about 12, with the proviso that said first polyethylene composition is a blend of at least two blend components comprising a first blend component having a Mw/Mn of from about 2 to about 4 and a second blend component having a Mw/Mn of from about 2 to about 4, wherein the first layer is a core layer; and 2) a second layer prepared from a second polyethylene composition having a melt index, I2, of from about 0.2 to about 10 grams per 10 minutes and a densizy which is lower than the density of said first polyethylene composition by an amount of from about 0.010 to about 0.060 g/cc; and B) stretching said multilayer film in the machine direction at a stretch ratio of from about 1:2 to about 1:12; wherein melt index is measured according to ASTM D1238 at 190° C. using a 2.16 kg weight and density is measured according to ASTM D792.

9. The method of claim 8, wherein said first blend component has a melt index I2 and said second blend component has a melt index $I_2$'; wherein the ratio ($I_2/I_2$') is greater than about 10.

10. The method of claim 8, wherein said stretching is done at a temperature below about 120° C.

11. The method of claim 8, wherein said multilayer film is a three layer film having two skin layers prepared from said second polyethylene composition and a core layer prepared from said first high density polyethylene composition.

12. The method of claim 8, wherein said multilayer film comprises at least five layers and wherein said multilayer film has two skin layers prepared from said second polyethylene composition and at least one core layer prepared from said first high density polyethylene composition.

13. The method of claim 8, wherein said multilayer film has a thickness of from about 0.5 to about 3 mils after said stretching.

14. The method of claim 8, wherein said first high density polyethylene composition further contains from about 100 to about 2000 parts per million of a nucleating agent.

15. A film made by the method of claim 8.

16. A package prepared from a film according to claim 8.

17. The method of claim 1, wherein said nucleating agent comprises the calcium salt of hexahydrophthalic acid.

* * * * *